(12) United States Patent
Takeuchi

(10) Patent No.: US 8,004,225 B2
(45) Date of Patent: Aug. 23, 2011

(54) DRIVE CONTROL CIRCUIT FOR ELECTRIC MOTOR AND ELECTRIC MOTOR EQUIPPED WITH SAME

(75) Inventor: Kesatoshi Takeuchi, Shioziri (JP)

(73) Assignee: Seiko Epson Corporation (JP)

( * ) Notice: Subject to any disclaimer, the term of this patent is extended or adjusted under 35 U.S.C. 154(b) by 564 days.

(21) Appl. No.: 12/124,230

(22) Filed: May 21, 2008

(65) Prior Publication Data

US 2008/0297090 A1 Dec. 4, 2008

(30) Foreign Application Priority Data

May 28, 2007 (JP) ................................. 2007-140775
Jan. 8, 2008 (JP) ................................. 2008-001574

(51) Int. Cl.
*H02P 7/14* (2006.01)

(52) U.S. Cl. ....................................... 318/479; 318/504

(58) Field of Classification Search .................. 318/478, 318/479, 504
See application file for complete search history.

(56) References Cited

U.S. PATENT DOCUMENTS

| | | | | | |
|---|---|---|---|---|---|
| 3,849,715 | A | * | 11/1974 | Irissou et al. | 318/696 |
| 4,031,419 | A | * | 6/1977 | Spiesberger et al. | 310/49.53 |
| 4,321,518 | A | * | 3/1982 | Akamatsu | 318/696 |
| 5,528,485 | A | * | 6/1996 | Devilbiss et al. | 363/89 |
| 6,841,954 | B2 | * | 1/2005 | Nakabayashi | 318/62 |
| 7,279,874 | B2 | * | 10/2007 | Masuda | 323/282 |
| 7,292,081 | B2 | * | 11/2007 | Takegami | 327/172 |
| 2006/0061308 | A1 | * | 3/2006 | Nakayama | 318/139 |
| 2007/0236194 | A1 | * | 10/2007 | Vo | 323/282 |
| 2009/0121659 | A1 | * | 5/2009 | Oyobe et al. | 318/12 |

FOREIGN PATENT DOCUMENTS

JP 2001-298982 10/2001
WO WO 2004/105222 * 12/2004

\* cited by examiner

*Primary Examiner* — Bentsu Ro
(74) *Attorney, Agent, or Firm* — Harness, Dickey & Pierce, P.L.C.

(57) ABSTRACT

The drive control circuit (200) includes a driver circuit (250) for intermittently supplying the magnetic coils with a supply voltage VSUP; a switching signal generating circuit (240) that generates a switching signal supplied to the driver circuit (250); and a voltage setter (270) that supplies a supply voltage control value Ya to the switching signal generating circuit (240). By adjusting pulse width of the switching signals DRVA1, DRVA2 with reference to the supply voltage control value Ya, the switching signal generating circuit (240) adjusts the effective voltage which is applied to the magnetic coils.

9 Claims, 16 Drawing Sheets

$Y = a \cdot X + b$
or
$Y = a(X + b)$

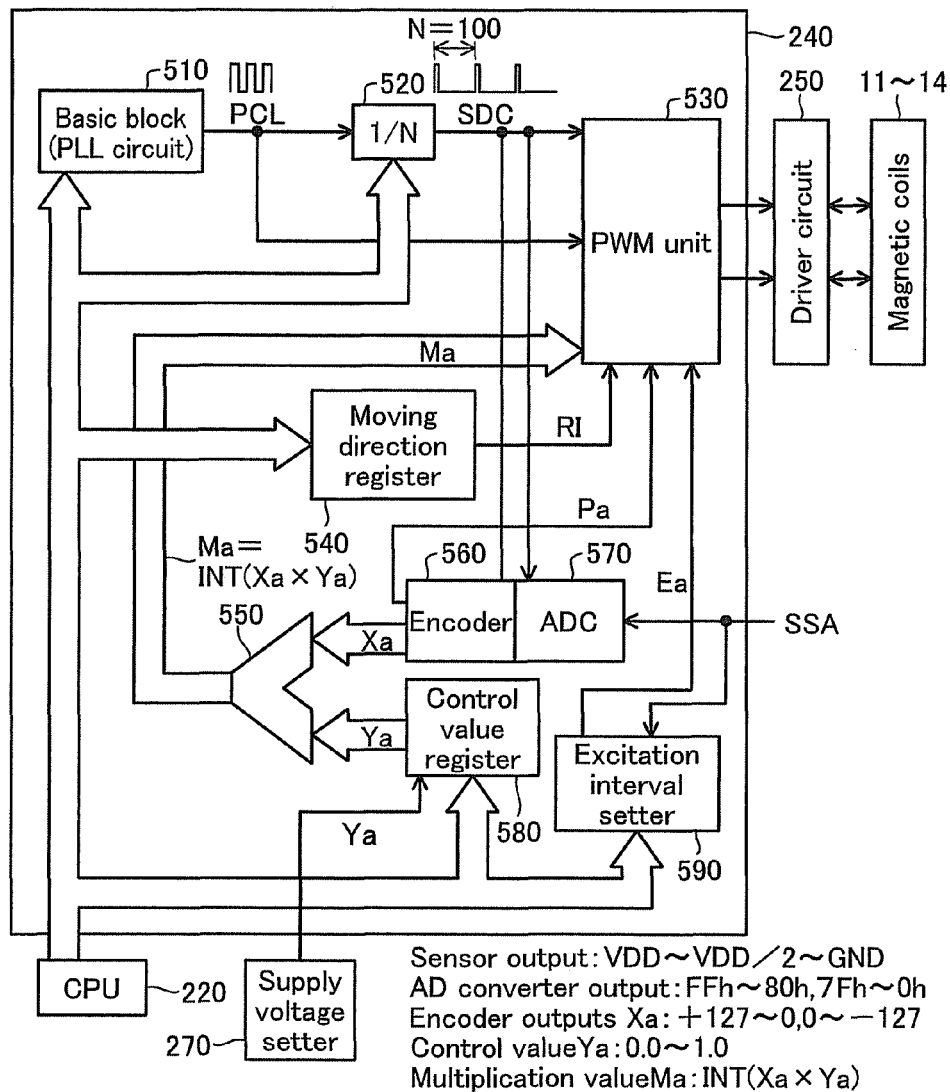

Fig.6

| Supply voltage VSUP [V] | Resistance R [Ω] | Motor characteristics (voltage unadjusted) | | | Resistance R [Ω] | Motor characteristics (voltage adjusted) | | |
|---|---|---|---|---|---|---|---|---|
| | | Effective voltage Veff [V] | Effective current Ieff [A] | Supply voltage control value Ya | | Effective voltage Veff [V] | Effective current Ieff [A] | Supply voltage control value Ya |
| 8 | 6.4 | 5.7 | 36.2 | 1.00 | 6.4 | 5.7 | 36.2 | 1.00 |
| 10 | 6.4 | 7.1 | 45.2 | 1.00 | 6.4 | 5.7 | 36.2 | 0.80 |
| 12 | 6.4 | 8.5 | 54.3 | 1.00 | 6.4 | 5.7 | 36.2 | 0.67 |
| 14 | 6.4 | 9.9 | 63.4 | 1.00 | 6.4 | 5.7 | 36.2 | 0.57 |

$Veff = Ya * VSUP/\sqrt{2}$  $Veff = Ya * VSUP/\sqrt{2}$  $Ya = Vref/VSUP = 8/VSUP$ Fig.7A
Fig.7B
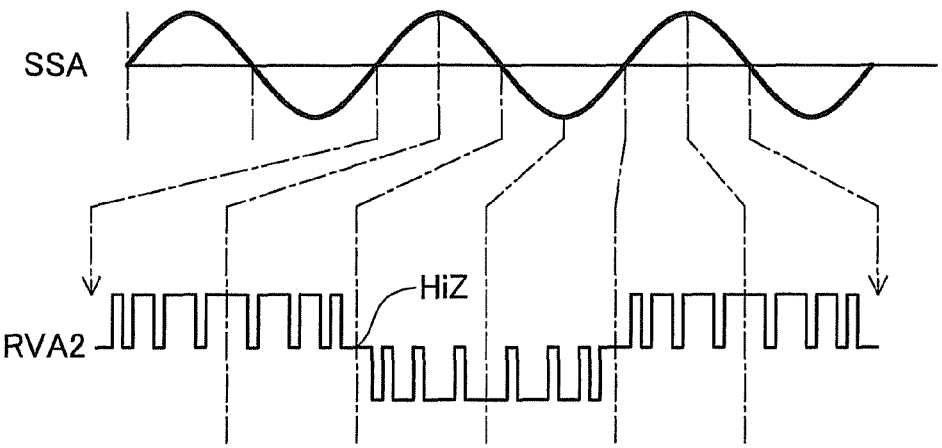
Fig.7C
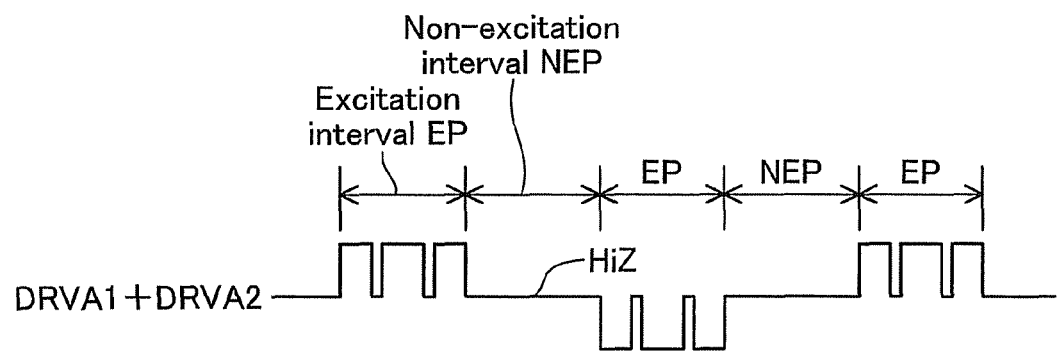

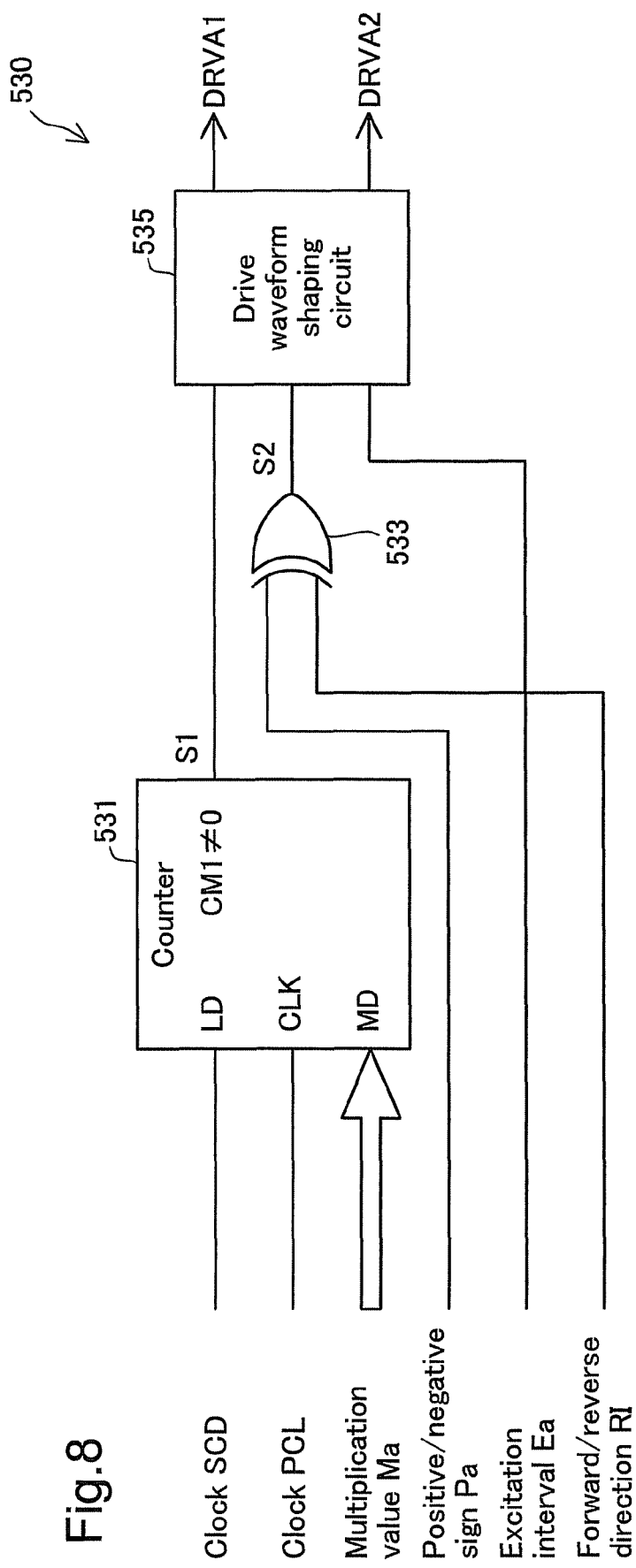

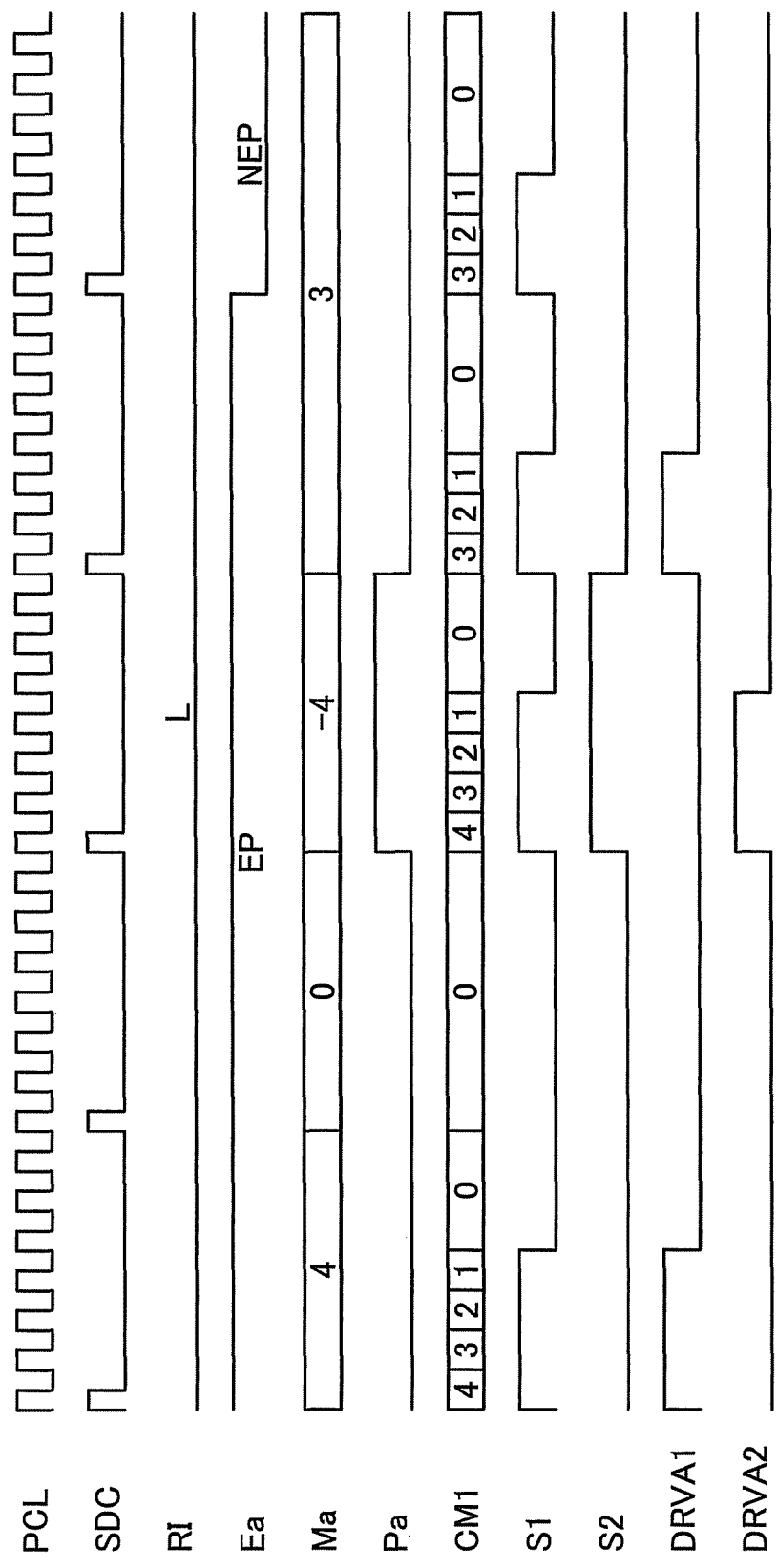

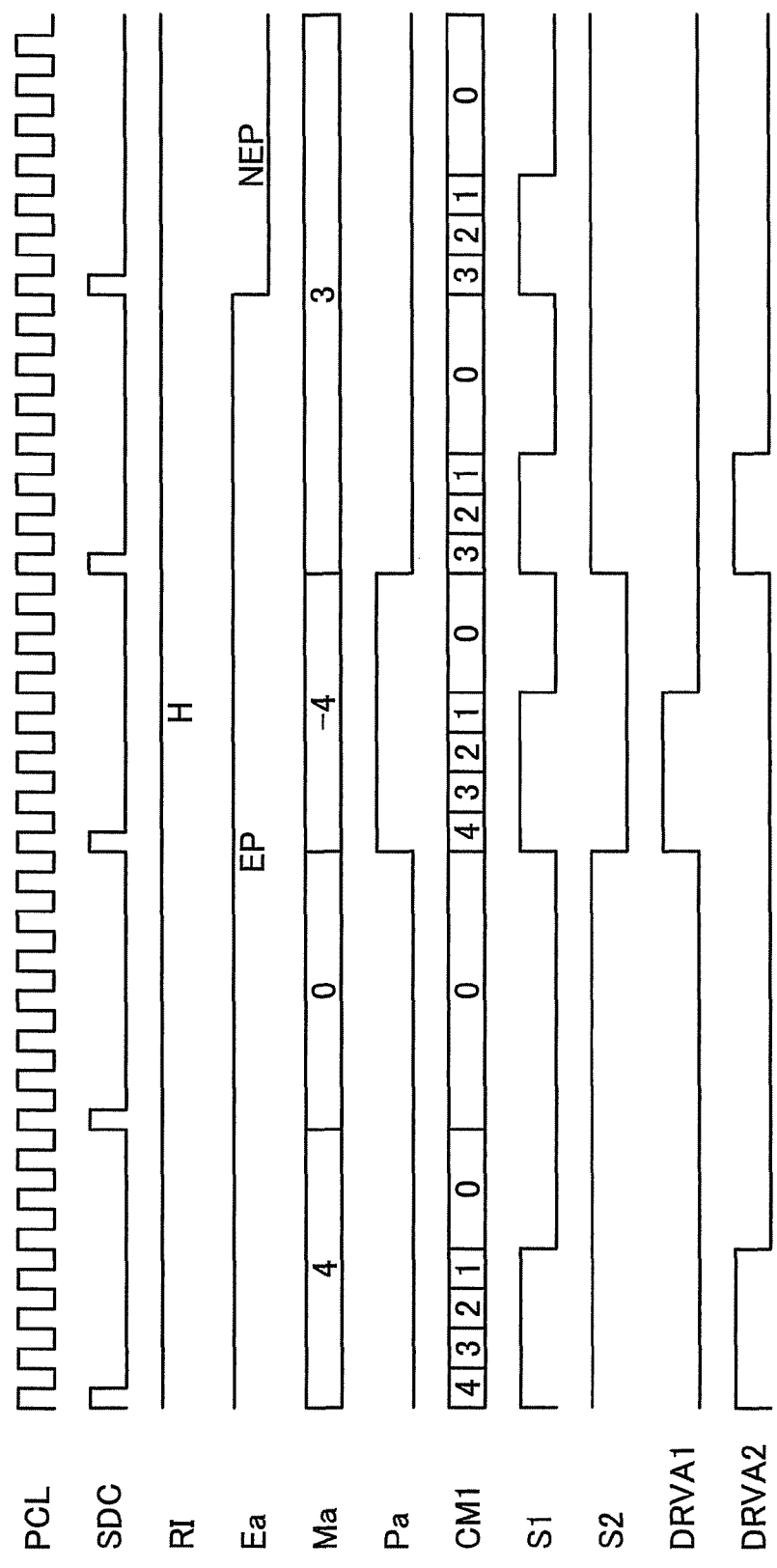

DRIVE CONTROL CIRCUIT FOR ELECTRIC MOTOR AND ELECTRIC MOTOR EQUIPPED WITH SAME

CROSS-REFERENCE TO RELATED APPLICATIONS

The present application claims the priority based on Japanese Patent Application No. 2007-140775 filed on May 28, 2007, and No. 2008-1574 filed on Jan. 8, 2008, the disclosures of which are hereby incorporated by reference in their entireties.

BACKGROUND OF THE INVENTION

1. Field of the Invention

This invention relates to an electric motor; and relates in particular to technology enabling supply of variable voltage to the magnetic coils.

2. Description of the Related Art

The brushless motor disclosed in Patent Citation 1 is one example of motors known in the art utilizing permanent magnets and magnetic coils.
Patent Citation 1: JP 2001-298982A Control of a brushless motor involves using a driver circuit composed of several switching transistors, and applying voltage to the magnetic coils through on/off control of the switching transistors.

Depending on the application for which a motor is used, there are instances in which different voltage values will be used as the supply voltage supplied to the motor. One problem encountered in the past was that in the case of different supply voltages, it was necessary for the drive control circuit of the motor to employ circuits customized for that particular voltage. Accordingly, there existed a need for motor control technology capable of adapting flexibly to changes in supply voltage.

SUMMARY OF THE INVENTION

It is therefore an object of the present invention to provide a motor control technology capable of adapting flexibly to changes in supply voltage.

According to an aspect of the present invention, there is provided a drive control circuit that controls an electric motor having a magnetic coil. The drive control circuit includes a driver circuit, a switching signal generating circuit, and a supply voltage setter. The driver circuit has a switching element that turns on/off a connection between the magnetic coil and a supply voltage supplied from an external power supply, thereby intermittently supplying the supply voltage to the magnetic coil. The switching signal generating circuit generates a switching signal for use in on/off control of the switching element. The supply voltage setter supplies the switching signal generating circuit with a supply voltage control value which is related to the supply voltage. The switching signal generating circuit adjusts effective voltage applied to the magnetic coil by adjusting pulse width of the switching signal according to the supply voltage control value.

According to this drive control circuit, the switching signal generating circuit adjusts the effective voltage for application to the magnetic coil by adjusting the pulse width of the switching signal in response to the supply voltage control value, thereby making possible appropriate control of the motor using the same drive control circuit, even where the motor supply voltage changes.

It is possible for the present invention to be reduced to practice in various embodiments, for example, as an electric motor; as a control method or control circuit for an electric motor; as an actuator employing these; and so on.

BRIEF DESCRIPTION OF THE DRAWINGS

FIGS. 5A-5E illustrate internal configuration and operation of a drive signal generator;

FIG. 6 shows comparison of motor characteristics;

FIGS. 7A-7C illustrate correspondence relationships of sensor output waveform and drive signal waveform;

FIG. 8 is a block diagram depicting internal configuration of a PWM unit;

FIG. 9 is a timing chart depicting operation of the PWM unit during forward rotation of the motor;

FIG. 10 is a timing chart depicting operation of the PWM unit during reverse rotation of the motor;

DESCRIPTION OF THE PREFERRED EMBODIMENT

The embodiments of the present invention will be described below in the following order.
A. Overview of Motor Configuration and Operation:
B. Configuration and Operation of Drive Control Circuit:
C. Other Configuration of Drive Control Circuit:
D. Modification Examples:

A. OVERVIEW OF MOTOR CONFIGURATION AND OPERATION

Figure 1B:
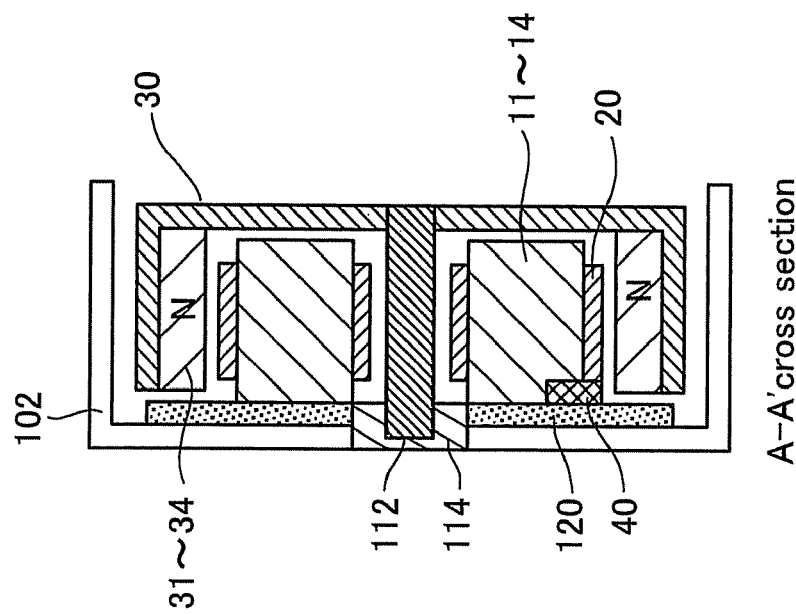
FIGS. 1A and 1B are sectional views depicting configuration of a motor unit of an electric motor in an embodiment.
Figure 1A:
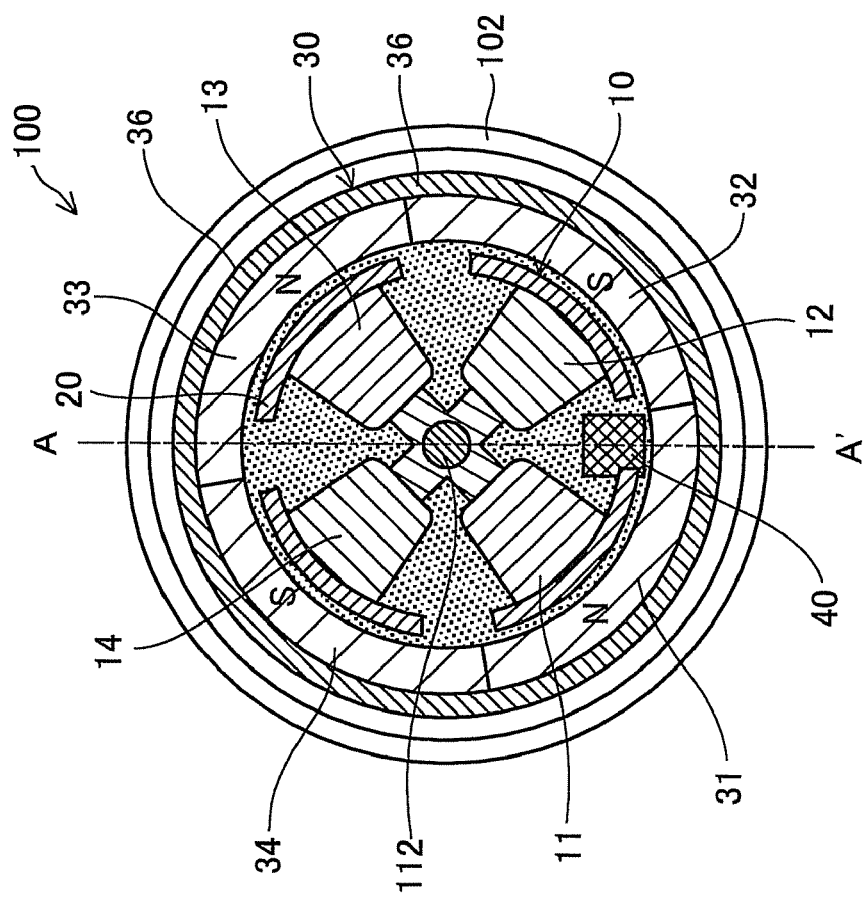

FIGS. 1A and 1B are sectional views depicting the configuration of the motor unit of a single-phase brushless motor in one embodiment of the present invention. This motor unit 100 has a stator portion 10 and a rotor portion 30, each of generally cylindrical tube shape. The stator portion 10 has four coils 11-14 arranged in a generally cross-shaped pattern, and a magnetic sensor 40 positioned at a center location between two of the coils 11, 12. The magnetic sensor 40 is used to detect the position of the rotor portion 30 (i.e. the phase of the motor). Each coil 11-14 is provided with a magnetic yoke 20 formed of a magnetic material. The shape of the magnetic yoke 20 will be discussed in detail later. The coils 11-14 and the magnetic sensor 40 are affixed on a circuit board 120 (FIG. 1B). The circuit board 120 is affixed to a casing 102. The cover of the casing 102 is omitted in the drawing.

The rotor portion 30 has four permanent magnets 31-34; the center axis of the rotor portion 30 constitutes a rotating shaft 112. This rotating shaft 112 is supported by a shaft bearing portion 114 (FIG. 1B). The direction of magnetization of the magnets extends in a direction radially outward from the rotating shaft 112. A magnetic yoke 36 is disposed to the outside of the magnets 31-34. This magnetic yoke 36 may be omitted.

Figure 2A:
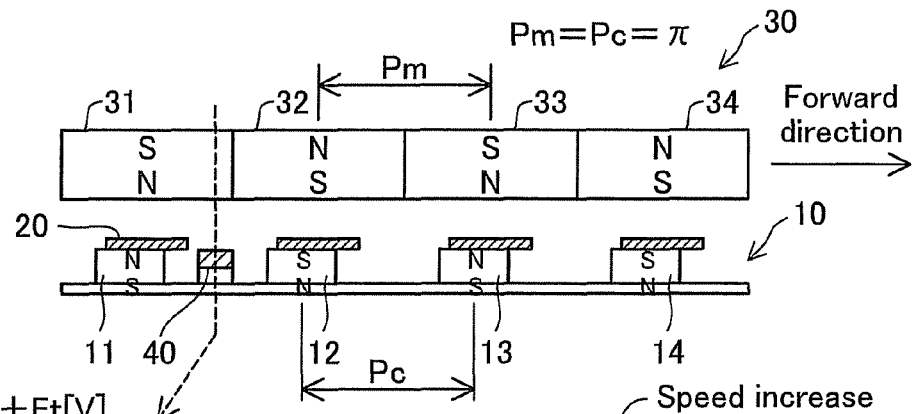
FIGS. 2A-2C illustrate the positional relationship of a magnet array and a coil array, and the relationship of magnetic sensor output to coil back electromotive force waveform.
Figure 2B:
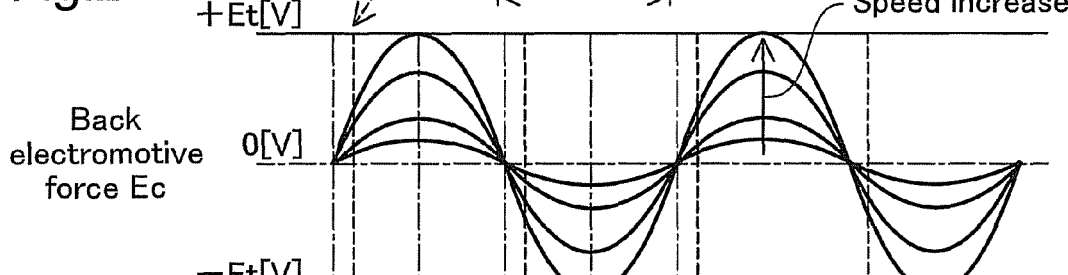
Figure 2C:
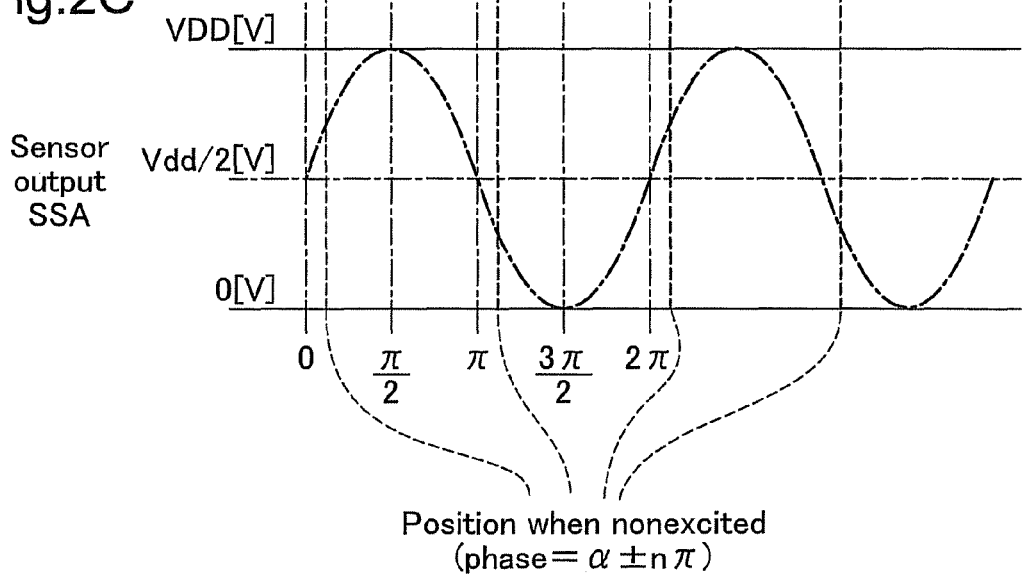

FIG. 2A illustrates the positional relationship of a magnet array and a coil array. FIGS. 2B and 2C show the relationship of magnetic sensor output to back electromotive force waveform. "Back electromotive force" is also called "induced voltage." As shown in FIG. 2A, the four magnets 31-34 are arranged at constant magnetic pole pitch Pm, with adjacent magnets being magnetized in opposite directions. The coils 11-14 are arranged at constant pitch Pc, with adjacent coils being excited in opposite directions. In this example, the magnetic pole pitch Pm is equal to the coil pitch Pc, and is equivalent to $\pi$ in terms of electrical angle. An electrical angle of $2\pi$ is associated with the mechanical angle or distance of displacement when the phase of the drive signal changes by $2\pi$. In the present embodiment, when the phase of the drive signal changes by $2\pi$, the rotor portion 30 undergoes displacement by the equivalent of twice the magnetic pole pitch Pm.

Of the four coils 11-14, the first and third coils 11, 13 are driven by drive signals of identical phase, while the second and fourth coils 12, 14 are driven by drive signals whose phase is shifted by 180 degrees ($=\pi$) from the drive signals of the first and third coils 11, 13. In ordinary two-phase driving, the phases of the drive signals of the two phases (Phase A and Phase B) would be shifted by 90 degrees ($=\pi/2$); in no instance would they be shifted by 180 degrees ($=\pi$). Also, in most motor drive methods, two drive signals phase-shifted by 180 degrees ($=\pi$) would be viewed as having identical phase. Consequently, the drive method of the motor in the present embodiment can be thought of as single-phase driving.

FIG. 2A shows the positional relationship of the magnets 31-34 and the coils 11-14, with the motor at a stop. In the motor of this embodiment, the magnetic yoke 20 provided to each of the coils 11-14 is offset slightly towards the direction of normal rotation of the rotor portion 30, with respect to the center of the coil. Consequently, when the motor stops, the magnetic yoke 20 of each coil will be attracted by the magnets 31-34, bringing the rotor portion 30 to a halt at a position with the magnetic yokes 20 facing the centers of the magnets 31-34. As a result, the motor will come to a halt at a position with the centers of the coils 11-14 offsetted with respect to the centers of the magnets 31-34. The magnetic sensor 40 is also situated at a position offsetted slightly from the boundary between adjacent magnets. The phase at this stop location is denoted as $\alpha$. While the $\alpha$ phase is not zero, it may be a value close to zero (e.g. about 5 to 10 degrees), or a value close to $\pi/2$ multiplied by an odd integer (e.g. close to a peak position of the back electromotive force).

FIG. 2B shows an example of waveform of back electromotive force generated by the coils; FIG. 2C shows an example of output waveform by the magnetic sensor 40. The magnetic sensor 40 is able to generate a sensor output SSA substantially similar in shape to the back electromotive force of the coils during motor operation. However, the output SSA of the magnetic sensor 40 has a non-zero value even when the motor is stopped (except in the case where the phase is an integral multiple of $\pi$). The back electromotive force of the coils tends to increase together with motor speed, but the shape of the waveform (sine wave) remains substantially similar. A Hall IC that utilizes the Hall effect may be employed as the magnetic sensor 40. In this example, the sensor output SSA and the back electromotive force Ec are both sine wave waveforms, or waveforms approximating a sine wave. As will be discussed later, the drive control circuitry of this motor utilizes the sensor output SSA to apply to the coils 11-14 voltage of waveform substantially similar in shape to the back electromotive force Ec.

In general, an electric motor functions as an energy conversion device that converts between mechanical energy and electrical energy. The back electromagnetic force of the coils represents mechanical energy of the motor that has been converted to electrical energy. Consequently, where electrical energy applied to the coils is converted to mechanical energy (that is, where the motor is driven), it is possible to drive the motor with maximum efficiency by applying voltage of similar waveform to the back electromagnetic force. As will be discussed below, "similar waveform to the back electromagnetic force" means voltage that generates current flowing in the opposite direction from the back electromagnetic force.

B. CONFIGURATION AND OPERATION OF DRIVE CONTROL CIRCUIT

Figure 3A:
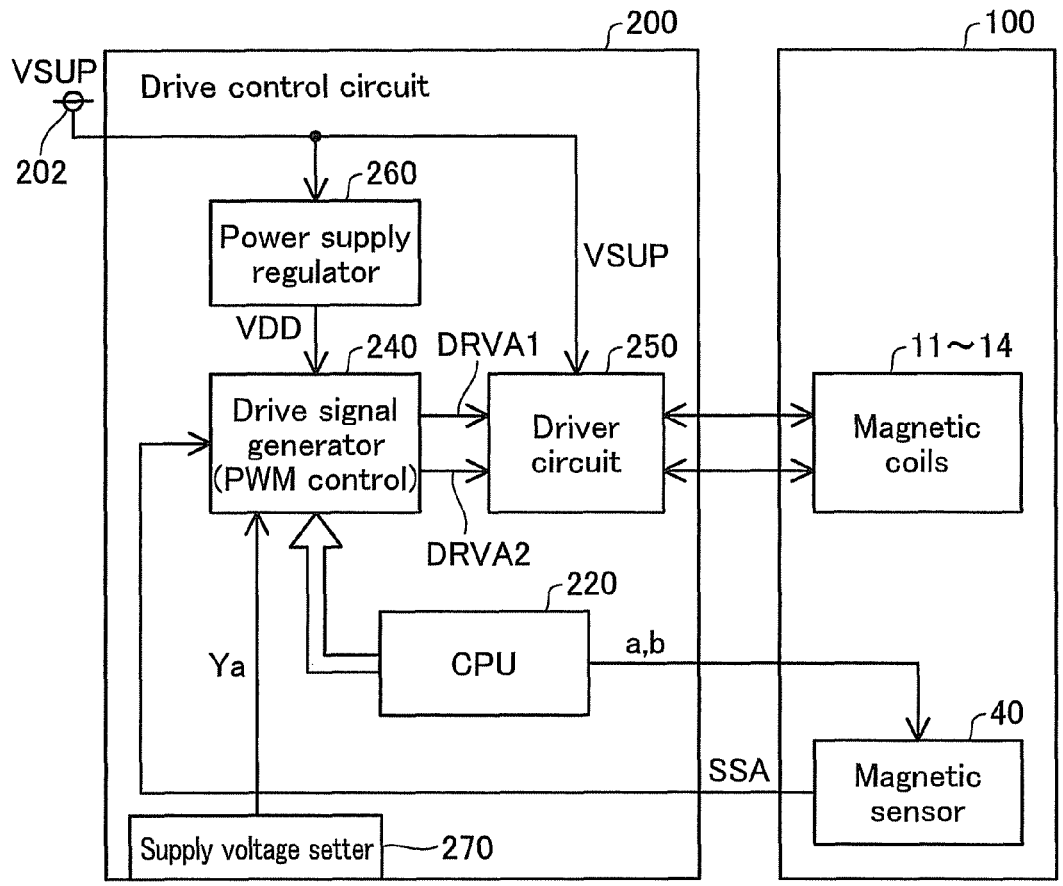
FIGS. 3A and 3B are block diagrams depicting a configuration of a drive control circuit of a motor in the embodiment.

FIG. 3A is a block diagram depicting a configuration of the drive control circuit of a brushless motor in the present embodiment. The drive control circuit 200 includes a CPU 220, a drive signal generator 240, a driver circuit 250, a power supply regulator 260, and a supply voltage setter 270. The CPU 220 may be omitted. Where the CPU 220 has been omitted, the functions of the CPU 220 described in the present embodiment will instead be accomplished by another circuit or circuits (e.g. a communications circuit or nonvolatile memory). Alternatively, it is acceptable to provide a communications circuit or interface circuit in place of the CPU 220, and to have this circuit receive operating commands of various kinds from an external device and transfer the commands to the circuit elements within the drive control circuit 200.

The power supply terminal 202 of the drive control circuit 200 is supplied externally with a DC supply voltage VSUP. Various values may be employed as the value of this supply voltage VSUP. In the present embodiment, it is assumed that four values, namely, 8 V, 10 V, 12 V, and 14 V, are utilizable as the supply voltage VSUP. From this supply voltage VSUP the power supply regulator 260 generates a power supply voltage VDD having a prescribed voltage value (e.g. 5 V), and supplies it to the drive signal generator 240 and to the CPU 220.

The drive signal generator 240 is a circuit that, on the basis of the output signal SSA from the magnetic sensor 40 within the motor unit 100, generates single-phase drive signals DRVA1, DRVA2 and supplies them to the driver circuit 250. Herein, the drive signals DRVA1, DRVA2 are also termed "switching signals" and the drive signal generator 240 is also termed a "switching signal generating circuit." In accordance with the drive signals DRVA1, DRVA2 the driver circuit 250 drives the magnetic coils 11 through 14 in the motor unit 100. The driver circuit 250 is also supplied with the unmodified supply voltage VSUP as its power supply voltage.

The supply voltage setter 270 is a circuit for allowing a user to specify the value of the supply voltage VSUP to be supplied to the power supply terminal 202. The supply voltage setter 270 notifies the drive signal generator 240 of a supply voltage control value Ya which has a value dependent on the specified value for the supply voltage VSUP. The supply voltage setter 270 may be designed to have any kind of user-operable control device enabling setting of the supply voltage VSUP. For example, the supply voltage setter 270 may be realized using various electronic components, such as fixed resistance switches, DIP switches, variable resistors, rewriteable non-volatile memory and so on. Alternatively, a circuit that detects the value of the supply voltage VSUP supplied to the power supply terminal 202, and that automatically determines the supply voltage control value Ya based on this detected value, may be employed as the supply voltage setter 270. The supply voltage setter 270 may also be constituted as a communications circuit or interface circuit that uses an I²C bus or the like, to allow the supply voltage control value Ya to be set from an external device.

Figure 3B:
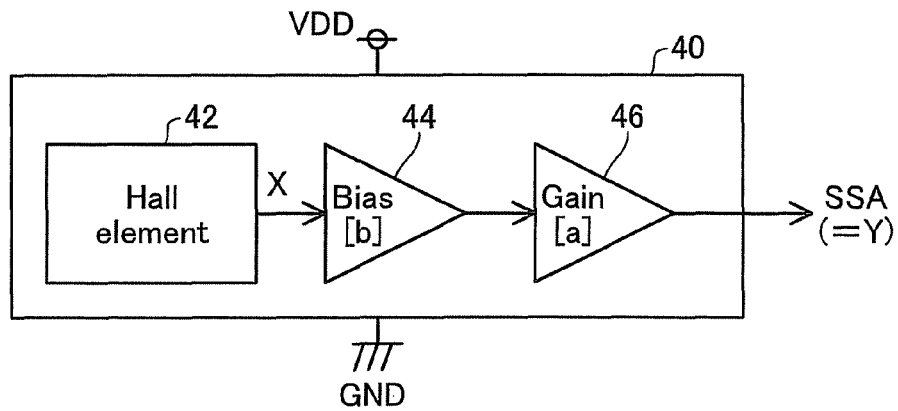

FIG. 3B depicts an example of internal configuration of the magnetic sensor 40. This magnetic sensor 40 has a Hall element 42, a bias adjustment portion 44, and a gain adjustment portion 46. The Hall element 42 measures the magnetic flux density X. The bias adjustment portion 44 adds a bias value b to the output X of the Hall element 42; the gain adjustment portion 46 performs multiplication by a gain value a. The output SSA (=Y) of the magnetic sensor 40 is given by the following Expression (1) or Expression (2), for example.

$$Y=a \cdot X+b \quad (1)$$

$$Y=a(X+b) \quad (2)$$

The gain value a and the bias value b of the magnetic sensor 40 are set within the magnetic sensor 40 by the CPU 220. By setting the gain value a and the bias value b to appropriate values, it is possible to correct the sensor output SSA to the preferred waveform shape.

Figure 4:
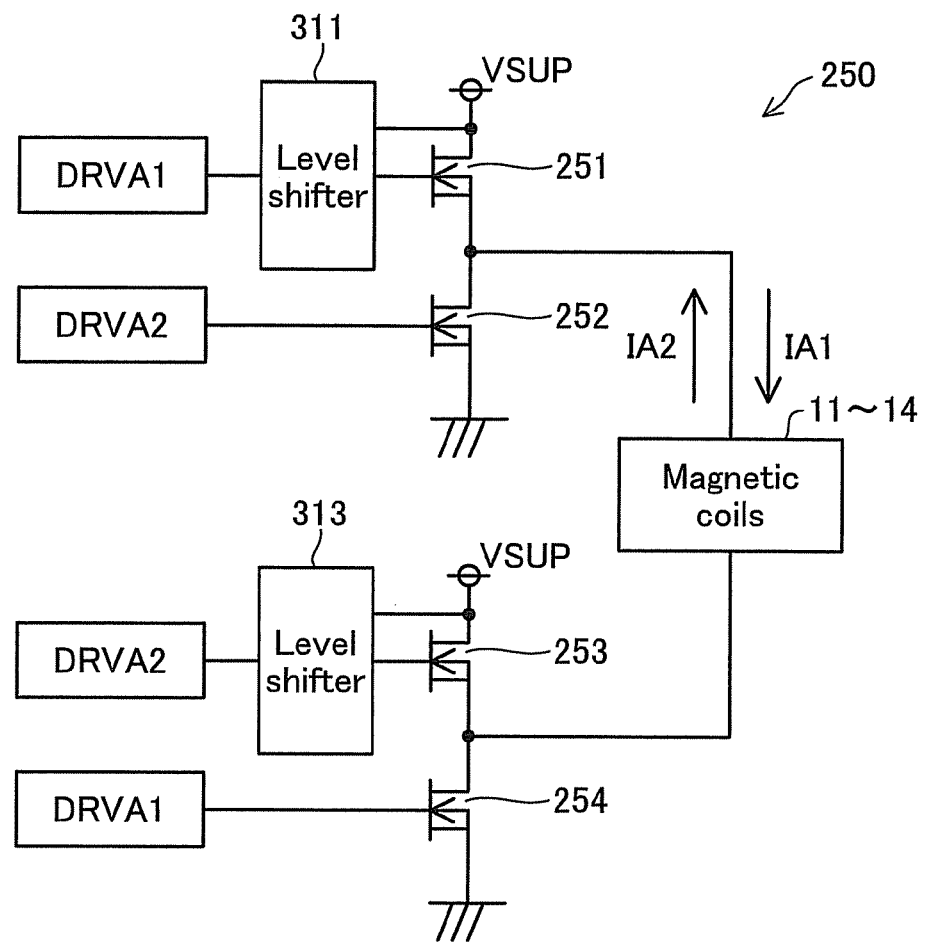
FIG. 4 shows internal configuration of a driver circuit.

FIG. 4 shows internal configuration of the driver circuit 250. This driver circuit 250 has four transistors 251 through 254 which make up an H bridge circuit. Level shifters 331, 313 are disposed to the front of the gate electrodes of the upper arm transistors 251, 253. However, the level shifters may be omitted. The transistors 251 through 254 of the driver circuit 250 are switched on/off according to the drive signals DRVA1, DRVA2 which function as switching signals, and as a result the magnetic coils 11 through 14 are supplied intermittently with the supply voltage VSUP. The arrows labeled IA1, IA2 indicate the direction of electrical current flow where the drive signals DRVA1, DRVA2 are H level, respectively. It is possible to utilize circuits of various designs composed of switching elements, as the driver circuit.

FIGS. 5A to 5E illustrate internal configuration and operation of the drive signal generator 240 (FIG. 3A). The drive signal generator 240 has a basic clock generating circuit 510, a 1/N frequency divider, a PWM unit 530, a moving direction register 540, a multiplier 550, an encoder unit 560, an AD converter 570, a supply voltage control value register 580, and an excitation interval setter 590.

The basic clock generating circuit 510 generates a clock signal PCL of prescribed frequency, and includes a PLL circuit for example. The frequency divider 520 generates a clock signal SDC having a frequency equal to 1/N the frequency of the clock signal PCL. The value of N is set to a prescribed constant. This value of N has been previously established in the frequency divider 520 by the CPU 220. The PWM unit 530 generates the AC single-phase drive signals DRVA1, DRVA2 based on the clock signals PCL, SDC, a multiplication value Ma supplied by the multiplier 550, a forward/reverse direction value RI supplied by the moving direction register 540, a positive/negative sign signal Pa supplied by the encoder unit 560, and an excitation interval signal Ea supplied by the excitation interval setter 590. This operation will be discussed later.

A value RI indicating the direction for motor rotation is established in the moving direction register 540, by the CPU 220. In the present embodiment, the motor will rotate forward when the forward/reverse direction value RI is L level, and rotate in reverse rotation when H level. The other signals Ma, Pa, Ea supplied to the PWM unit 530 are determined as follows.

The output SSA of the magnetic sensor 40 is supplied to the AD converter 570. This sensor output SSA has a range, for example, of from GND (ground potential) to VDD (power supply voltage), with the middle point thereof (=VDD/2) being the π phase point of the output waveform, or the point at which the sine wave passes through the origin. The AD converter 570 performs AD conversion of this sensor output SSA to generate a digital value of sensor output. The output of the AD converter 570 has a range, for example, of FFh to 0h (the "h" suffix denotes hexadecimal), with the median value of 80h corresponding to the π phase point of the sensor waveform.

The encoder unit 560 converts the range of the sensor output value subsequent to AD conversion, and sets the value of the π phase point of the sensor output value to 0. As a result, the sensor output value Xa generated by the encoder unit 560 assumes a prescribed range on the positive side (e.g. between +127 and 0) and a prescribed range on the negative side (e.g. between 0 and −127). However, the value supplied to the multiplier 560 by the encoder unit 560 is the absolute value of the sensor output value Xa; the positive/negative sign thereof is supplied to the PWM unit 530 as the positive/negative sign signal Pa.

The supply voltage control value register 580 stores a supply voltage control value Ya input from the supply voltage setter 270. This supply voltage control value Ya functions as a value for setting the application voltage to the motor. The value Ya can assume a value between 0 and 1.0, for example. The value Ya=0 will mean that the application voltage is zero, and Ya=1.0 will mean that the application voltage is at maximum value. In this embodiment, the supply voltage control value Ya is set at a value (Ya=Vref/VSUP) that is equal to a predetermined non-zero reference voltage Vref divided by the supply voltage VSUP, and it takes a non-zero value accordingly. The multiplier 550 performs multiplication of the supply voltage control value Ya and the sensor output value Xa output from the encoder unit 560 and conversion to an integer; the multiplication value Ma thereof is supplied to the PWM unit 530.

FIGS. 5B to 5E depict operation of the PWM unit 530 in instances where the multiplication value Ma takes various different values. Here, it is assumed that there are no non-excitation intervals, so that all intervals are excitation intervals. The PWM unit 530 is a circuit that, during one period of the clock signal SDC, generates one pulse with a duty factor of Ma/N. Specifically, as shown in FIGS. 5B to 5E, the pulse duty factor of the single-phase drive signals DRVA1, DRVA2 increases in association with increase of the multiplication value Ma. The first drive signal DRVA1 is a signal that generates a pulse only when the sensor output SSA is positive and the second drive signal DRVA2 is a signal that generates a pulse only when the sensor output SSA is positive; in FIGS. 5B to 5E, both are shown together. For convenience, the second drive signal DRVA2 is shown in the form of pulses on the negative side.

As discussed previously, the multiplication value Ma is the result of multiplying the supply voltage control value Ya by the absolute value Xa of the sensor output SSA; and the drive signals DRVA1, DRVA2 are switching signals having pulse width proportional to this multiplication value Ma. Consequently, the pulse width of the drive signals DRVA1, DRVA2 will be proportional to the supply voltage control value Ya. The effective voltage applied to the magnetic coils 11 through 14 will be proportional to the pulse width of the drive signals DRVA1, DRVA2. Consequently, the effective voltage applied to the magnetic coils 11 through 14 will be a value proportional to the supply voltage control value Ya.

FIG. 6 shows a comparison of motor characteristics in a case with supply voltage adjustment and another case without the supply voltage adjustment. Here, a "case without the supply voltage adjustment" refers to an instance in which the supply voltage control value Ya is maintained at 1.0 irrespective of the value of the supply voltage VSUP. On the other hand, a "case with the supply voltage adjustment" refers to an instance in which the supply voltage control value Ya is changed depending on the value of the supply voltage VSUP. Here, the resistance R of the coils, the effective voltage Veff, the effective current Ieff (=Veff/R), and the supply voltage control value Ya are shown by way of motor characteristics.

In the example of FIG. 6, it is assumed that the supply voltage VSUP uses one of the four values 8 V, 10 V, 12 V, and 14 V. The resistance R of the magnetic coils of the motor is 6.4Ω. Where voltage adjustment is not carried out, the effective voltage Veff applied to the magnetic coils will be equivalent to the supply voltage VSUP divided by √2. On the other hand, where voltage adjustment is carried out, the effective voltage Veff applied to the magnetic coils will equal the value of the supply voltage control value Ya multiplied by the supply voltage VSUP, divided by √2. Stated in the opposite way, the supply voltage control value Ya is set to a value equivalent to a prescribed reference voltage value Vref (here, 8 V) divided by the supply voltage VSUP. For example, where the supply voltage VSUP is 8 V, the supply voltage control value Ya will be 1.0; and where the supply voltage VSUP is 10 V, the supply voltage control value Ya will be 0.8. Where voltage adjustment has been carried out in this way, the value of the effective voltage Veff applied to the magnetic coils will consistently assume a constant value of 5.7 V irrespective of the value of the supply voltage VSUP. Consequently, it is possible for the motor to be operated with consistently identical motor characteristics regardless of which value has been employed for the supply voltage VSUP.

Any value lying within the range of supply voltage VSUP applicable to a given motor or to a given drive control circuit can be used as the reference voltage Vref mentioned above. However, where the smallest value in the supply voltage VSUP range is employed as the reference voltage Vref the effective current Ieff can be maintained at a value which corresponds to this smallest voltage value, thus preventing excessive current from flowing to the coils.7

FIGS. 7A to 7C depict correspondence between sensor output waveform and waveform of the drive signals generated by the PWM unit 530. In the drawing, "Hiz" denotes a state of high impedance where the magnetic coils are not excited. As described in FIGS. 7B to 7E, the single-phase drive signals DRVA1, DRVA2 are generated by PWM control using the analog waveform of the sensor output SSA. Consequently, using these single-phase drive signals DRVA1, DRVA2 it is possible to supply to the coils effective voltage that exhibits changes in level corresponding to change in the sensor outputs SSA, SSB.

The PWM unit 530 is constructed such that drive signals are output only during the excitation intervals indicated by the excitation interval signal Ea supplied by the excitation interval setter 590, with no drive signals being output at intervals except for the excitation intervals (non-excitation intervals). FIG. 7C depicts drive signal waveforms produced in the case where excitation intervals EP and non-excitation intervals NEP have been established by the excitation interval signal Ea. During the excitation intervals EP, the drive signal pulses of FIG. 7B are generated as is; during the non-excitation intervals NEP, no pulses are generated. By establishing excitation intervals EP and non-excitation intervals NEP in this way, voltage will not be applied to the coils in proximity to the middle point of the back electromotive force waveform (i.e. in proximity to the middle point of the sensor output), thus making possible further improvement of motor efficiency. Preferably the excitation intervals EP will be established at intervals symmetric about the peak of the back electromotive force waveform, and the non-excitation intervals NEP will be established in intervals symmetric about the mid point of the back electromotive force waveform. It should be noted that the excitation interval setter 590 may be omitted.

FIG. 8 is a block diagram depicting the internal configuration of the PWM unit 530 (FIG. 5A). The PWM unit 530 has a counter 531, an EXOR circuit 533, and a drive waveform shaping circuit 535. Their operation will be described below.

FIG. 9 is a timing chart depicting operation of the PWM unit 530 during forward rotation of the motor. The drawing show the two clock signals PCL and SDC, the forward/reverse direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping circuit 535. For each one cycle of the clock signal SDC, the counter 531 repeats an operation of decrementing the count value CM1 to 0, in sync with the clock signal PCL. The initial value of the count value CM1 is set to the multiplication value Ma. In FIG. 9, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 that represents the exclusive OR of the positive/negative sign signal Pa and the forward/reverse direction value RI. Where the motor is rotating forward, the forward/reverse direction value RI will be at L level. Consequently, the output S2 of the EXOR circuit 533 will be a signal identical to the positive/negative sign signal Pa. The drive waveform shaping circuit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is at L level will be output as the drive signal DRVA1, and the signal during intervals in which the output S2 of the EXOR circuit 533 is at H level will be output as the drive signal DRVA2. In proximity to the right edge in FIG. 9, the excitation interval signal Ea falls to L level thereby establishing a non-excitation interval NEP. Consequently, neither of the drive signals DRVA1, DRVA2 will be output during this non-excitation interval NEP, and a state of high impedance will be maintained.

FIG. 10 is a timing chart depicting operation of the PWM unit 530 during reverse rotation of the motor. Where the motor is rotating in reverse, the forward/reverse direction value RI will be at H level. As a result, the two drive signals DRVA1, DRVA2 switch relative to FIG. 9, and it will be appreciated that the motor runs in reverse as a result.

Figure 11A:
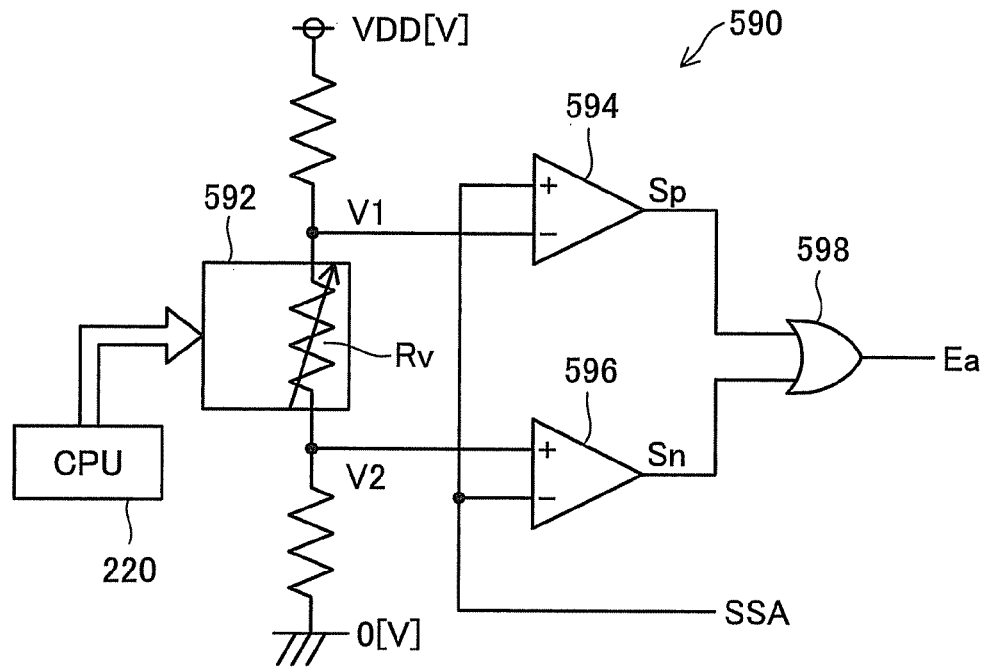
FIGS. 11A and 11B illustrate internal configuration and operation of an excitation interval setter.
Figure 11B:
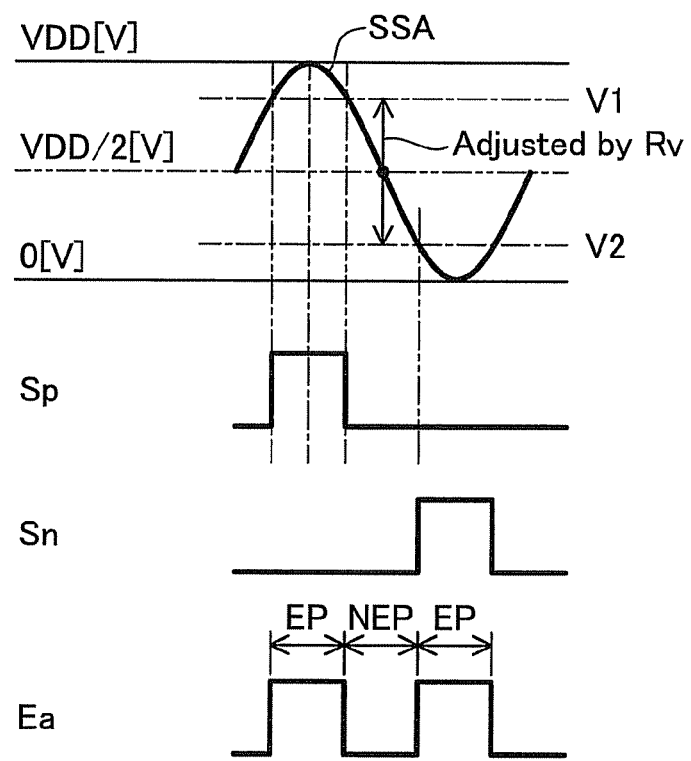

FIGS. 11A and 11B illustrate the internal configuration and operation of an excitation interval setter 590. The excitation interval setter 590 has an electronic variable resistor 592, a voltage comparators 594, 596, and an OR circuit 598. The resistance Rv of the electronic variable resistor 592 is set by the CPU 220. The voltages V1, V2 at either terminal of the electronic variable resistor 592 are supplied to one of the input terminals of the voltage comparators 594, 596. The sensor output SSA is supplied to the other input terminal of the voltage comparators 594, 596. The output signals Sp, Sn of the voltage comparators 594, 596 are input to the OR circuit 598. The output of the OR circuit 598 is the excitation interval signal Ea, which is used to differentiate excitation intervals and non-excitation intervals.

FIG. 11B depicts operation of the excitation interval setter 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal derived by taking the logical sum of the these output signals Sp, Sn. Consequently, as shown at bottom in FIG. 11B, the excitation interval signal Ea can be used as a signal indicating excitation intervals EP and non-excitation intervals NEP. The excitation intervals EP and non-excitation intervals NEP are established by the CPU 220, by adjusting the variable resistance Rv.

According to the motor of the present embodiment, the user can specify in the supply voltage setter 270 a value for supply voltage VSUP in this way, thereby making it possible to operate a motor at the same characteristics using any supply voltage VSUP. Thus, for motors such as fan motors, it will be possible at the motor manufacturer end to achieve uniform management of parts management/parts procurement through standardization of parts for motors of given power capacity, and to thereby improve productivity through standardized manufacturing processes, making lower costs easier to achieve a result. On the design end for applications utilizing motors, it will be possible to standardize multiple motors for use in installations with different service voltages, and to achieve uniform procurement and improved productivity through settings made according to driving voltage, making lower costs easier to achieve a result. Furthermore, on the design end for applications utilizing motors, it will be possible to achieve speed control to speed up to the limit for specified speed (from a stop to the maximum specified speed) in a system, within the specified voltage of the motor.

C. OTHER CONFIGURATION OF DRIVE CONTROL CIRCUIT

Figure 12:
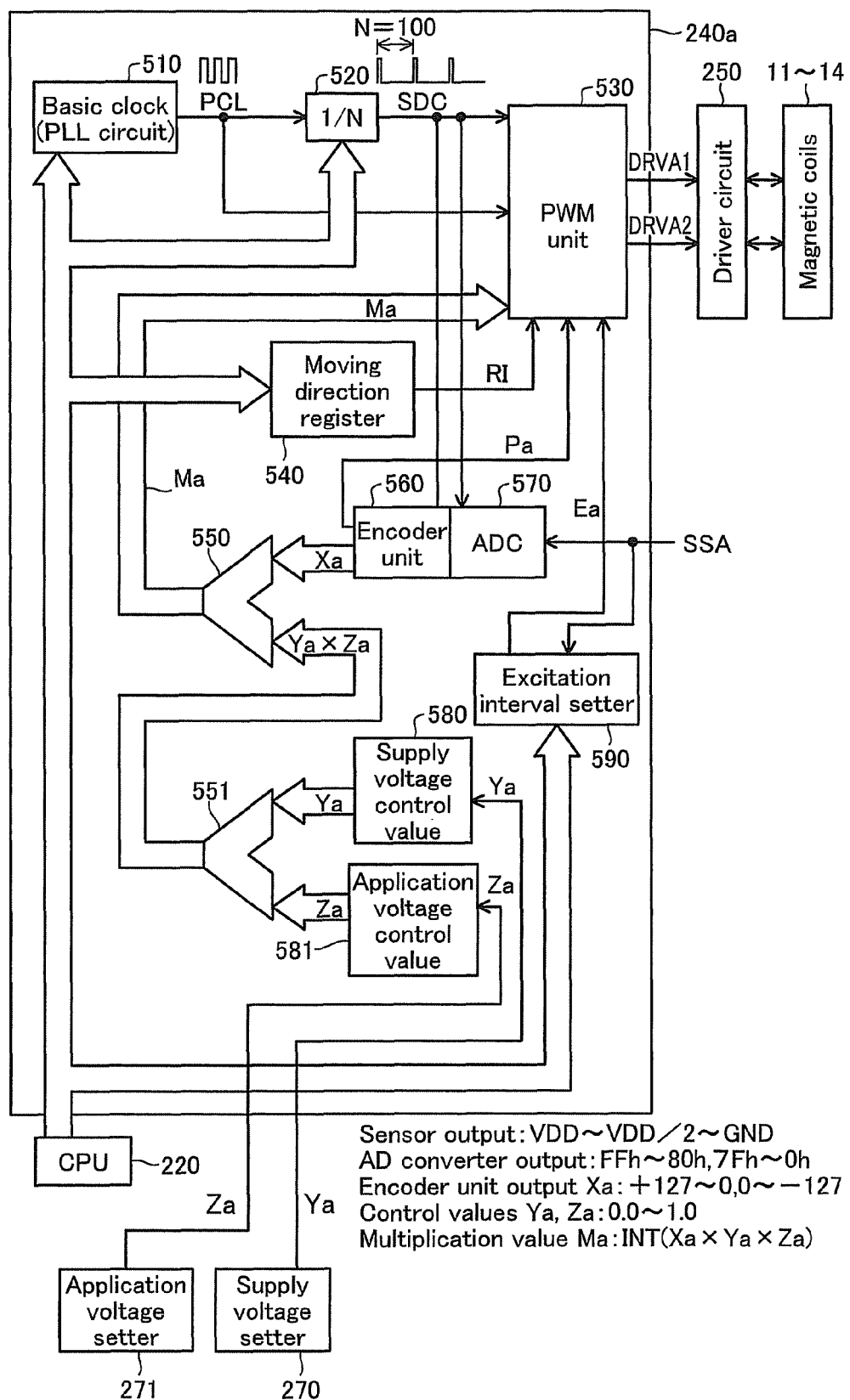
FIG. 12 illustrates another configuration of a drive signal generator.

FIG. 12 is an illustration depicting another configuration of the drive signal generator. This drive signal generator 240a is similar in configuration to the circuit 240 shown in FIG. 5 but additionally having a multiplier 551, an applied voltage control value register 581, and an applied voltage setter 271. The applied voltage setter 271 is a circuit for setting an application voltage control value Za. The application voltage control value Za may be used, for example, to change the effective voltage to be applied to the magnetic coils during operation of the motor. The specific circuit configuration of the applied voltage setter 271 may be one similar to that of the supply voltage setter 270. The application voltage control value Za is supplied from the applied voltage setter 271 to the applied voltage control value register 581, where it is held. The multiplier 551 multiplies the supply voltage control value Ya and the application voltage control value Za, and supplies the multiplied value (Ya×Za) to the multiplier 550. The multiplier 550 multiplies this value (Ya×Za) by the sensor output value Xa, and supplies the multiplied value Ma (=Xa×Ya×Za) to the PWM unit 530.

By providing the multipliers in two stages in this way, using the two control values Ya, Za it is possible to control the effective voltage which is applied to the magnetic coils. For example, it will be possible to use the first control value Ya as an instruction value for use by the motor manufacturer to set specified voltage; and to use the second control value Za as an instruction value for the purpose of variable control of voltage by the assembler of a system using the motor. It will also be possible to configure a circuit that uses multipliers in three or more stages, and three or more control values. Specifically, the multiplier unit used for computing the multiplied value Ma which is targeted for PWM control may be composed of a single multiplier, or of several multiplier configured in multiple stages.

D. MODIFICATION EXAMPLES

This invention is not limited by the embodiments set forth hereinabove by way of illustration, and various other embodiments such as the following are possible within the scope and spirit thereof, such as the following modifications for example.

D1. Modification Example 1

It is possible to use various circuit configurations besides the configuration of the drive signal generator 240 shown in FIG. 5 as the circuit for generating switching signals. For example, the switching signal generating circuit may be constructed as a circuit that carries out PWM control by comparing sensor output with a reference triangular waveform. Moreover, switching signals may be generated by some method besides PWM control. In general, it is possible to employ any of various circuits that adjust the effective voltage applied to the magnetic coils, through adjustment of switching signal pulse width depending on supply voltage.

As discussed in FIG. 6, in the drive control circuit in the preceding embodiments, the pulse width of the switching signals DRVA1, DRVA2 is adjusted to give a constant value of effective voltage for application to the magnetic coils, irrespective of the value of the supply voltage VSUP. However, it is acceptable for the effective voltage applied to the magnetic coils to assume different values (in other words, for motor output to assume different values) in the event of different values of the supply voltage VSUP. Such a configuration may be achieved, for example, by having the supply voltage setter 270 determine the supply voltage control value Ya in such a way that different preset effective voltage values are obtained in association with different supply voltage VSUP values.

D2. Modification Example 2

In the preceding embodiments, any of several predetermined values (8 V, 10 V, 12 V, 14 V) could be selected as the supply voltage VSUP; however, an arrangement whereby supply voltage VSUP can be set to any value within a prescribed range would also be possible.

D3. Modification Example 3

While an analog magnetic sensor is employed in the preceding embodiments, it is possible to use a digital magnetic sensor having multivalue analog-like output in place of an analog magnetic sensor. Both an analog magnetic sensor and a digital magnetic sensor having multivalue output will have an output signal exhibiting analog-like change. Herein, an "output signal exhibiting analog-like change" refers in the broad sense to include both analog output signals and multi-level digital output signals having three or more levels, excluding On/Off binary output signals. It is also possible to generate an output signal that exhibits analog-like change by using a another location sensor, instead of a magnetic sensor.

D4. Modification Example 4

The present invention is not limited to the single-phase brushless motor described in the preceding embodiments, and can be implemented in motors of any number of phases and number of poles.

D5. Modification Example 5

The present invention is applicable to motors and devices of various kinds such as fan motors, clocks for driving the clock hands, drum type washing machines with single rotation, jet coasters, and vibrating motors. Where the present invention is implemented in a fan motor, the various advantages mentioned previously (low power consumption, low vibration, low noise, minimal rotation irregularities, low heat emission, and long life) will be particularly notable. Such fan motors may be employed, for example, as fan motors for digital display devices, vehicle on-board devices, fuel cell equipped apparatuses such as fuel cell equipped personal computers, fuel cell equipped digital cameras, fuel cell equipped video cameras and fuel cell equipped mobile phones, projectors, and various other devices. The motor of the present invention may also be utilized as a motor for various types of household electric appliances and electronic devices. For example, a motor in accordance with the present invention may be employed as a spindle motor in an optical storage device, magnetic storage device, and polygon mirror drive.

Figure 13:
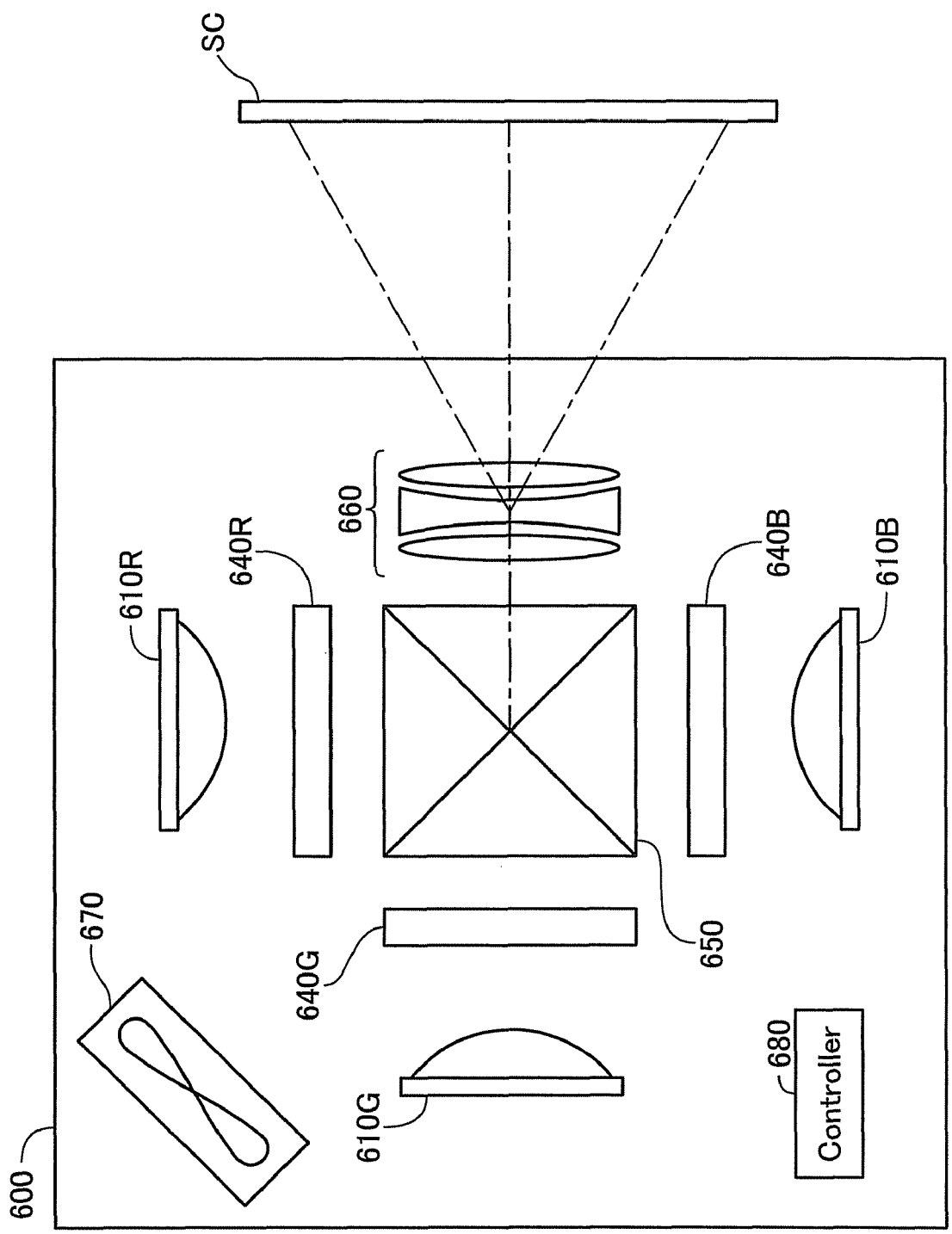
FIG. 13 illustrates a projector which utilizes a motor according to an the embodiment of the present invention.

FIG. 13 illustrates a projector utilizing a motor according to the present invention. The projector 600 includes three light sources 610R, 610G, 610B for emitting three colored lights of red, green and blue, three liquid crystal light valves 640R, 640G, 640B for modulating the three colored lights, a cross dichroic prism 650 for combining the modulated three colored lights, a projection lens system 660 for projecting the combined colored light toward a screen SC, a cooling fan 670 for cooling the interior of the projector, and a controller 680 for controlling the overall projector 600. Various rotation type brushless motors described above can be used as the motor for driving the cooling fan 670.

Figure 14A:
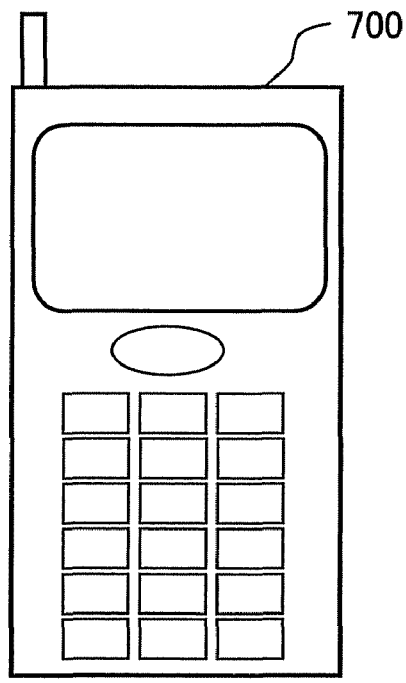
FIGS. 14A-14C illustrate a fuel cell type mobile phone which utilizes a motor according to an the embodiment of the present invention.
Figure 14B:
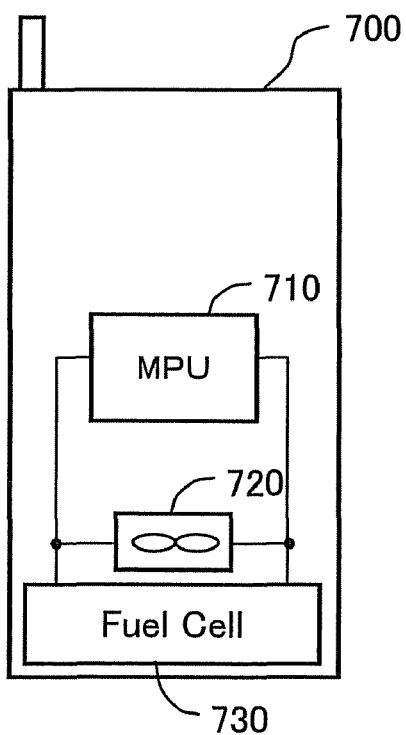
Figure 14C:
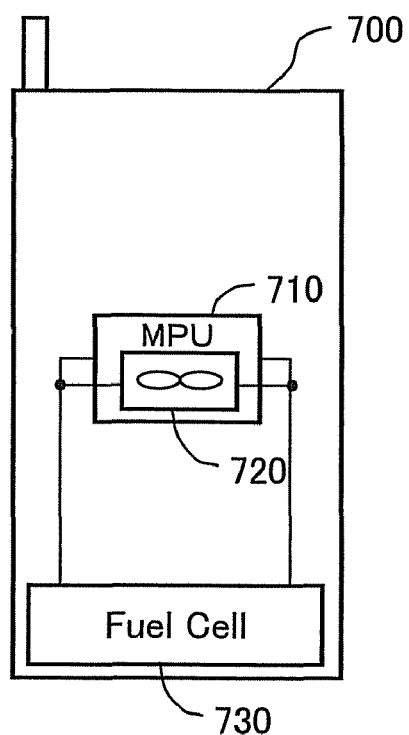

FIGS. 14A-14C illustrate a mobile phone utilizing a motor according to the present invention. FIG. 14A shows the external view of a mobile phone 700, and FIG. 14B shows its exemplary internal configuration. The mobile phone 700 includes a MPU 710 for controlling the operation of the mobile phone 700, a fan 720, and a fuel cell 730. The fuel cell 730 supplies power to the MPU 710 and the fan 720. The fan 720 is installed in order to introduce air into the interior of the mobile phone 700 to supply the air to the fuel cell 730, or to exhaust the interior of the mobile phone 700 of water which will be produced by the fuel cell 730. The fan 720 may be installed over the MPU 710, as illustrated in FIG. 14C, to cool the MPU 710. Various rotation type brushless motors described above can be used as the motor for driving the fan 720.

Figure 15:
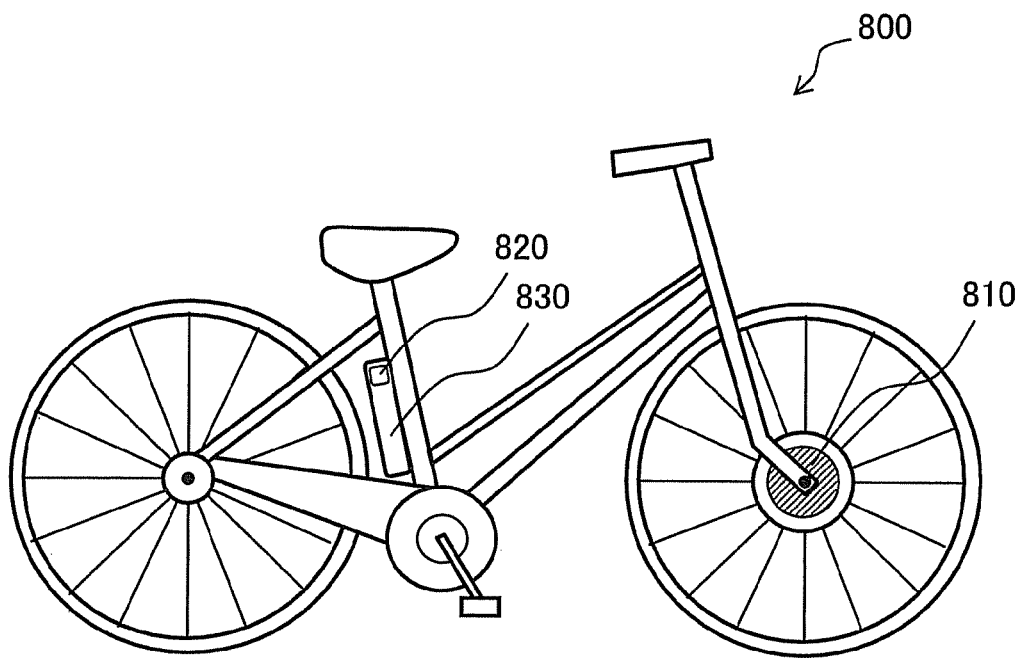
FIG. 15 illustrates an electric bicycle (power-assisted bicycle) as an example of a moving body which utilizes a motor/generator according to an the embodiment of the present invention.

FIG. 15 illustrates an electric bicycle (electric-assisted bicycle) as an example of a moving body utilizing a motor according to the present invention. The bicycle 800 includes a motor 810 at the front wheel, and a control circuit 820 and a rechargeable battery 830 both attached on the frame under the saddle. The motor 810 powered by the battery 830 drives the front wheel to assist the run. During braking, the regenerated power by the motor 810 is charged in the battery 830. The control circuit 820 controls the drive and regeneration of the motor 810. Various brushless motors described above can be used as the motor 810.

Figure 16:
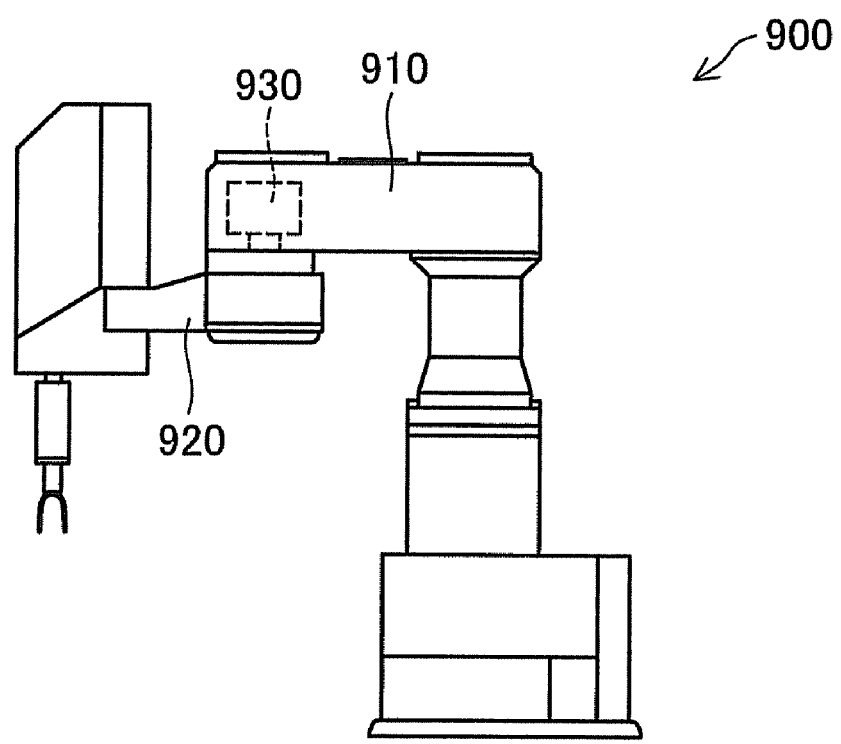
FIG. 16 illustrates an example of a robot which utilizes a motor according to an the embodiment of the present invention.

FIG. 16 illustrates a robot utilizing a motor according to the present invention. The robot 900 includes a first arm 910, a second arm 920, and a motor 930. The motor 930 is used to horizontally rotate the second arm 920 as a driven member for the motor. Various brushless motors described above can be used as the motor 930.

What is claimed is:
1. A drive control circuit that controls an electric motor having a magnetic coil, comprising:
   a driver circuit having a switching element that turns on/off a connection between the magnetic coil and a supply voltage supplied from an external power supply, thereby intermittently supplying the supply voltage to the magnetic coil;
   a switching signal generating circuit that generates a switching signal for use in on/off control of the switching element; and
   a supply voltage setter that supplies the switching signal generating circuit with a supply voltage control value which is related to the supply voltage;
   wherein the switching signal generating circuit adjusts an effective voltage applied to the magnetic coil by adjusting a pulse width of the switching signal according to the supply voltage control value such that the effective voltage applied to the magnetic coil assumes a prescribed constant value irrespective of the value of the supply voltage, and
   wherein the switching signal generating circuit includes:
      a waveform signal generator that generates a waveform signal which exhibits a periodic change in wave shape and which has amplitude inversely proportional to the value of the supply voltage; and a PWM control circuit that executes PWM control based on the waveform signal to generate the switching signal which exhibits change in effective value equivalent to the change of the waveform signal.

2. The drive control circuit according to claim 1, wherein the waveform signal generator generates the waveform signal as a signal which exhibits change proportional to analog-like change of an output of a magnetic sensor provided to the electric motor, and which has amplitude inversely proportional to the value of the supply voltage.

3. The drive control circuit according to claim 2, wherein the supply voltage control value is inversely proportional to the value of the supply voltage; and
the waveform signal generator includes
a multiplying unit that generates the waveform signal by multiplying the supply voltage control value and a sensor output value which indicates the output of the magnetic sensor provided to the electric motor.

4. The drive control circuit according to claim 3, wherein the multiplying unit includes multiple stages of multipliers that generate the waveform signal by multiplying the sensor output value and the supply voltage control value and at least one other voltage control value.

5. The drive control circuit according to claim 1, wherein the supply voltage setter is configured such that the value of the supply voltage is specifiable as one of a plurality of prescribed values.

6. The drive control circuit according to claim 1, wherein the supply voltage setter is configured such that the value of the supply voltage is specifiable as any value in a prescribed range.

7. An electric motor comprising:
a coil array having a plurality of magnetic coils;
a magnet array having a plurality of permanent magnets; and
the drive control circuit according to claim 1.

8. A device comprising:
the electric motor according to claim 7; and
a driven component driven by the electric motor.

9. A moving body comprising the electric motor according to claim 7.

* * * * *